(12) United States Patent
Karpoor et al.

(10) Patent No.: US 9,704,112 B2
(45) Date of Patent: Jul. 11, 2017

(54) GLOBAL ENTITY-TO-ENTITY INTEGRATION PLATFORM USING STANDARDS-BASED APPLICATION PROGRAM INTERFACES (APIS)

(71) Applicant: Verizon Patent and Licensing Inc., Arlington, VA (US)

(72) Inventors: Deepak Karpoor, Fairfax, VA (US); Darshan Mehta, Howell, NJ (US); Bradley D. Rockwell, Allen, TX (US); Milian Ly, Fairfax, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 445 days.

(21) Appl. No.: 14/524,121

(22) Filed: Oct. 27, 2014

(65) Prior Publication Data

US 2016/0119405 A1 Apr. 28, 2016

(51) Int. Cl.
*G06Q 10/06* (2012.01)
(52) U.S. Cl.
CPC .................... *G06Q 10/06* (2013.01)
(58) Field of Classification Search
CPC ........................................ G06Q 10/06
See application file for complete search history.

(56) References Cited

U.S. PATENT DOCUMENTS

| | | | | |
|---|---|---|---|---|
| 2012/0047223 A1* | 2/2012 | Tarkoma | ............. | H04L 67/1097 709/217 |
| 2012/0166308 A1* | 6/2012 | Ahmed | .................. | G06Q 20/12 705/26.41 |
| 2012/0203765 A1* | 8/2012 | Ackerman | ........ | G06F 17/30038 707/722 |
| 2013/0198308 A1* | 8/2013 | Yang | .................. | H04L 12/5855 709/206 |

* cited by examiner

*Primary Examiner* — Jerry Dennison

(57) ABSTRACT

A system and method may provide standardized application programming interfaces that enable global entity-to-entity communications, such as to enable a process associated with one entity to access multiple systems at another entity. Some benefits of a global, standardized API-based entity-to-entity data exchange and integration platform include reduced cycle times by accelerating service delivery through automated and streamed data collection processes and an improved overall interface experience by embedding data collection processes into existing tools and improving accuracy by reducing manual data entry errors. For example, the standardized APIs may be used to generate a service request sent from a first service provider to a second service provider to ask the second service provider to provision a service to a customer of the first service provider.

17 Claims, 13 Drawing Sheets

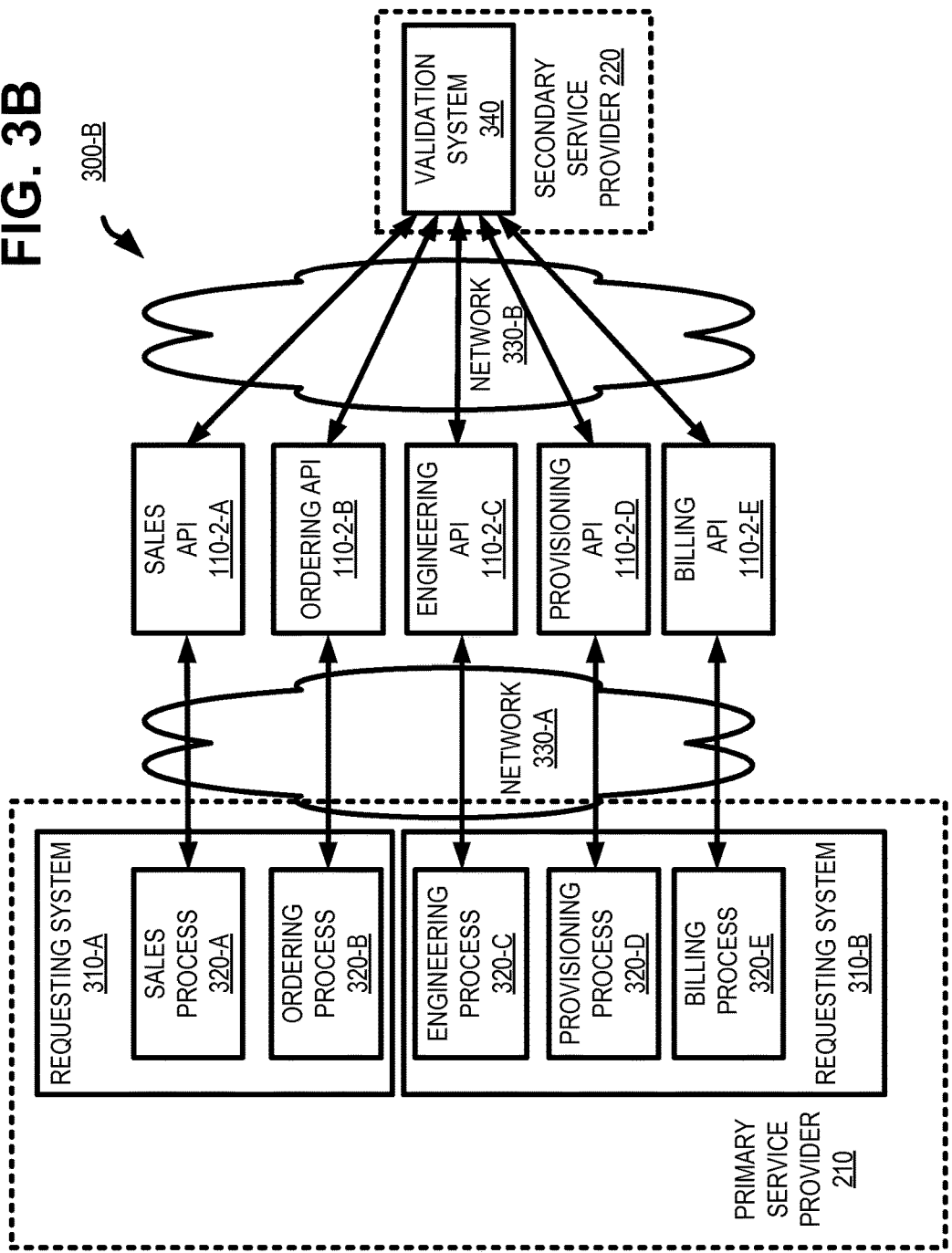

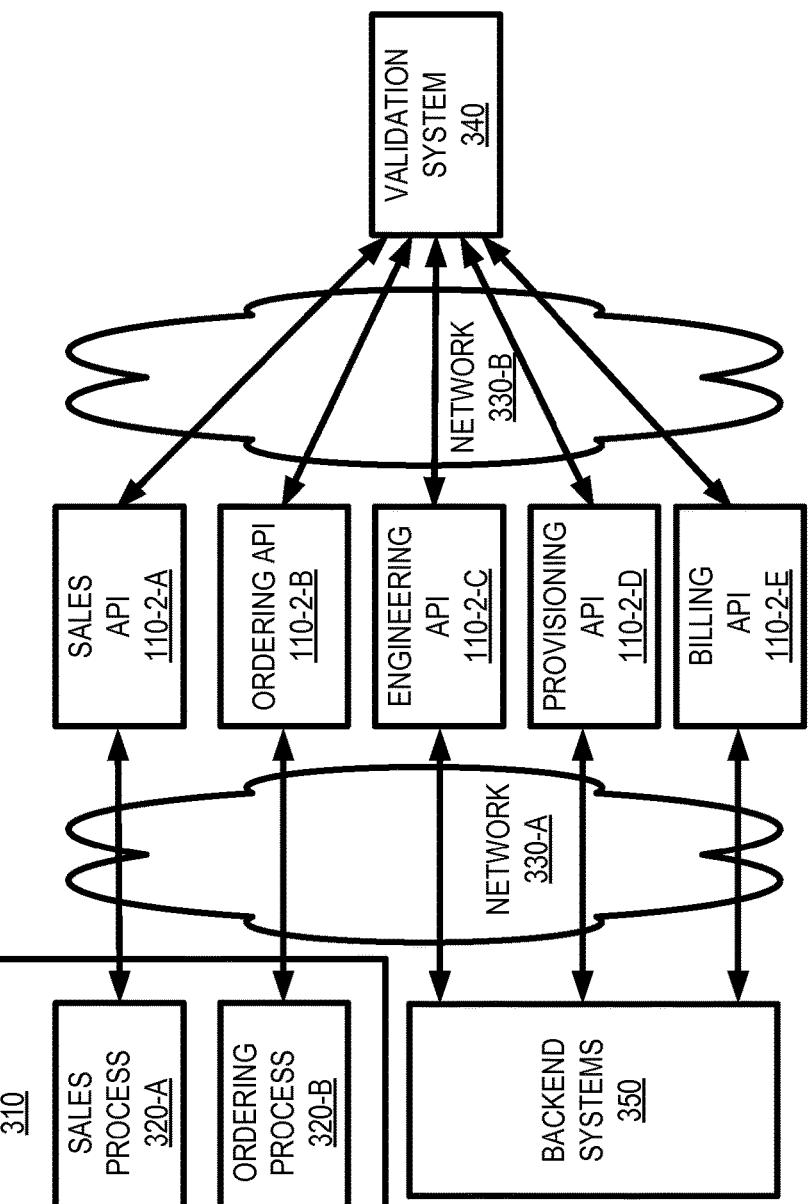

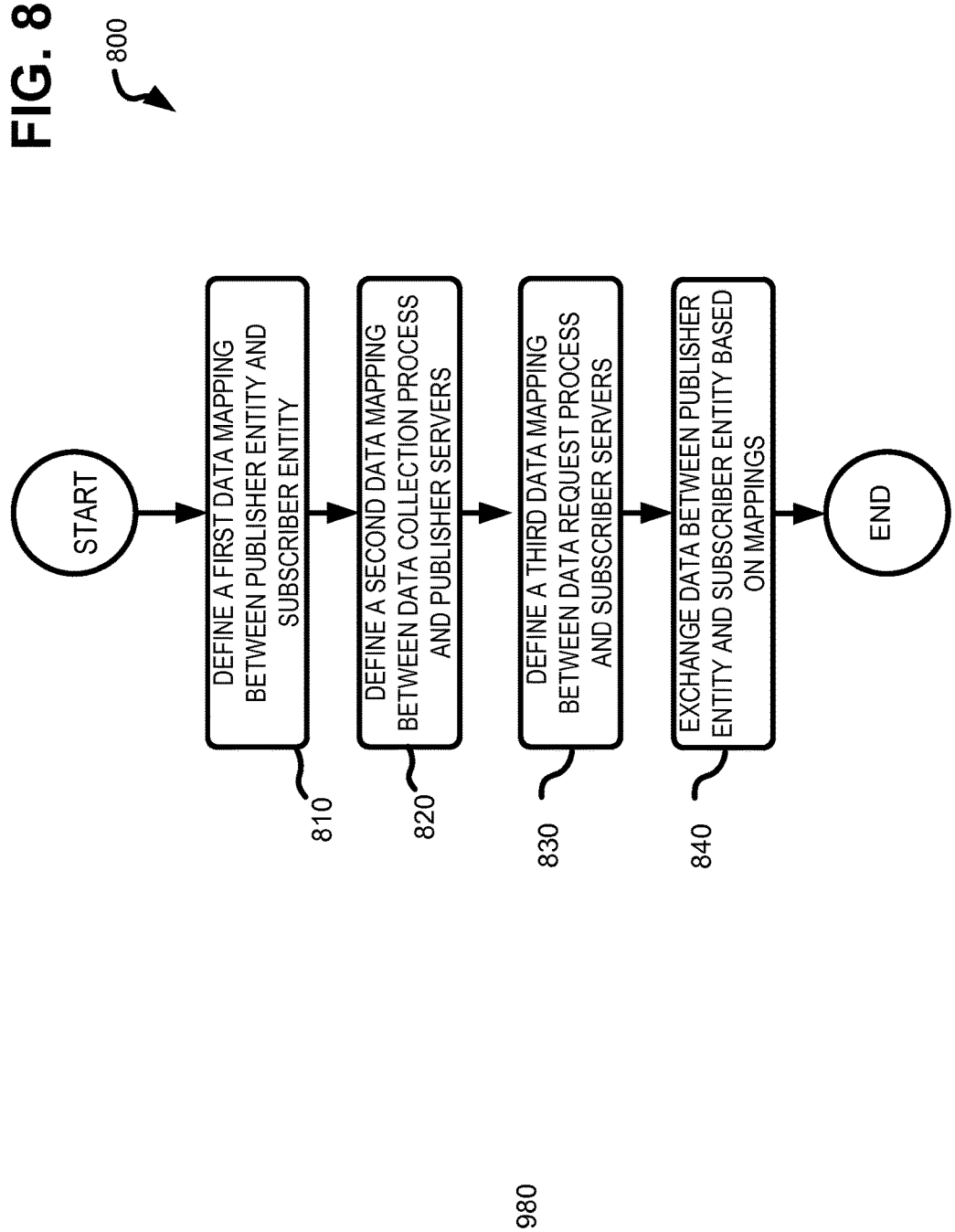

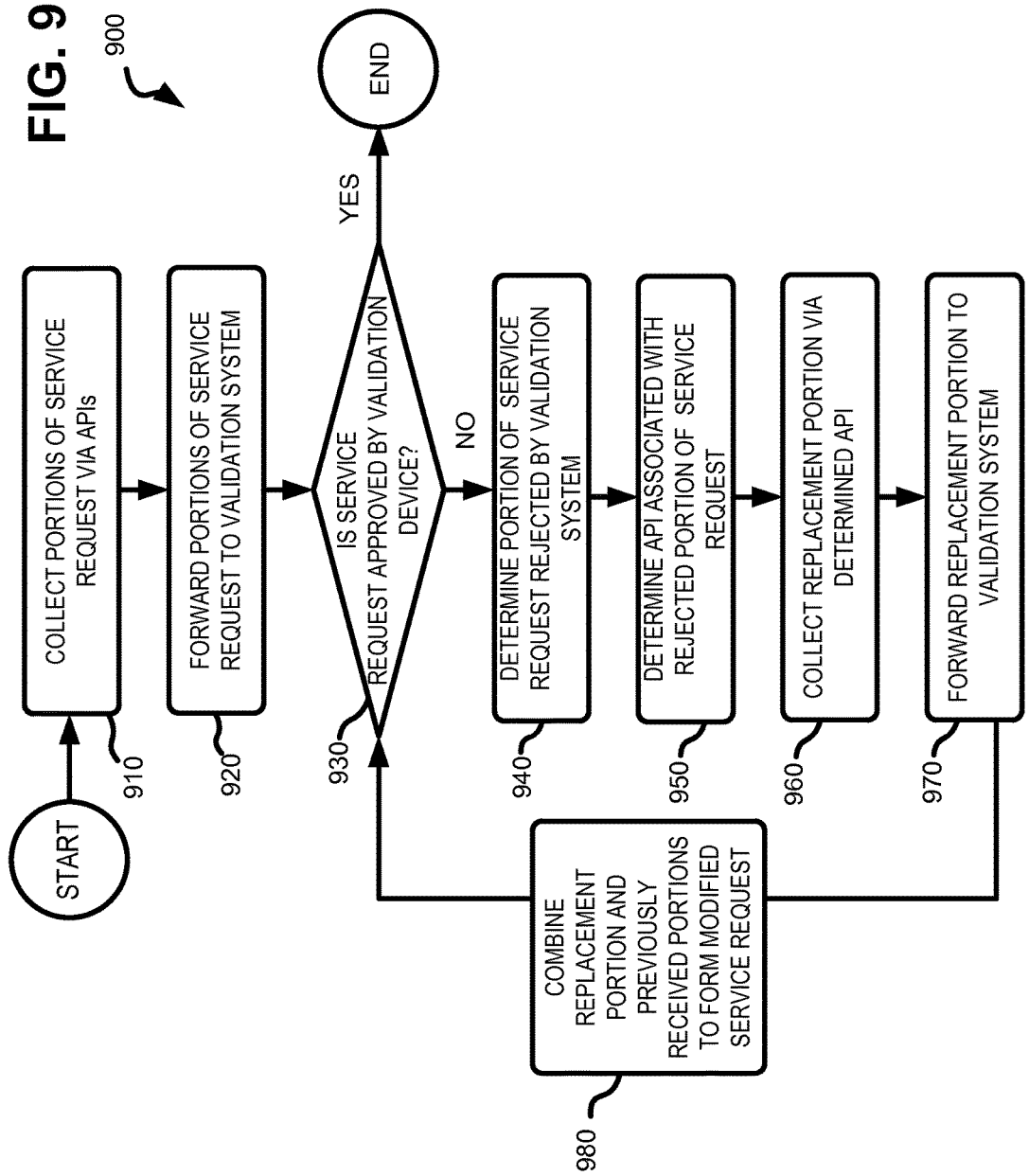

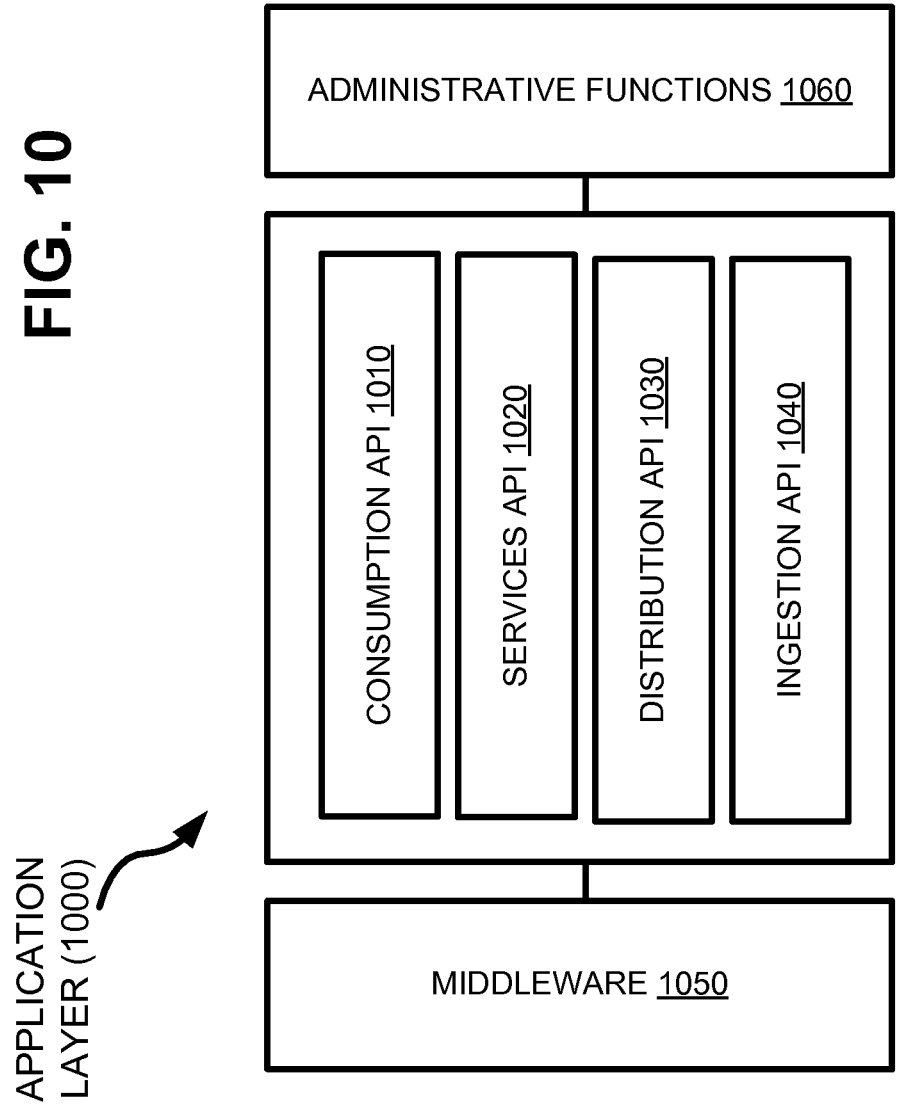

GLOBAL ENTITY-TO-ENTITY INTEGRATION PLATFORM USING STANDARDS-BASED APPLICATION PROGRAM INTERFACES (APIS)

BACKGROUND INFORMATION

In business applications, business entities in one computing system often communicate with business entities that reside in a different computing system to exchange information. For instance, a business may need to exchange order and billing data with customers and operations data to coordinate with associated businesses, such as sub-contractors, vendors, suppliers, subsidiaries, etc. Certain business processes may use an application programming interface (API) to exchange data. An API is a pathway to information and may provide, for example, a direct connection for one application to speak to another and exchange information. Thus, APIs may create connections between business systems, enabling near-instant transmission of important information across applications.

However, APIs currently do not function to enable global entity-to-entity communications, such as to enable a process associated with one entity to access multiple systems at another entity. Potential benefits of a global standardized API-based entity-to-entity data exchange and integration platform include reduced cycle times by accelerating service delivery through automated and streamed data collection processes and an improved overall interface experience by embedding data collection processes into existing tools and improving accuracy by reducing manual data entry errors.

BRIEF DESCRIPTION OF THE DRAWINGS

FIGS. 3A-3D illustrate exemplary systems for generating and handling service requests within the environments of FIGS. 1 and 2;

FIG. 8 is a flowchart of an exemplary process for using APIs to exchange data between entities within the environment of FIG. 1;

FIG. 9 is a flowchart of an exemplary process for generating and handling service requests within the environment of FIGS. 2 and 3A-3D; and FIG. 10 shows an exemplary set of APIs that can be used to provide certain services within an application.

DETAILED DESCRIPTION OF PREFERRED EMBODIMENTS

Figure 1:
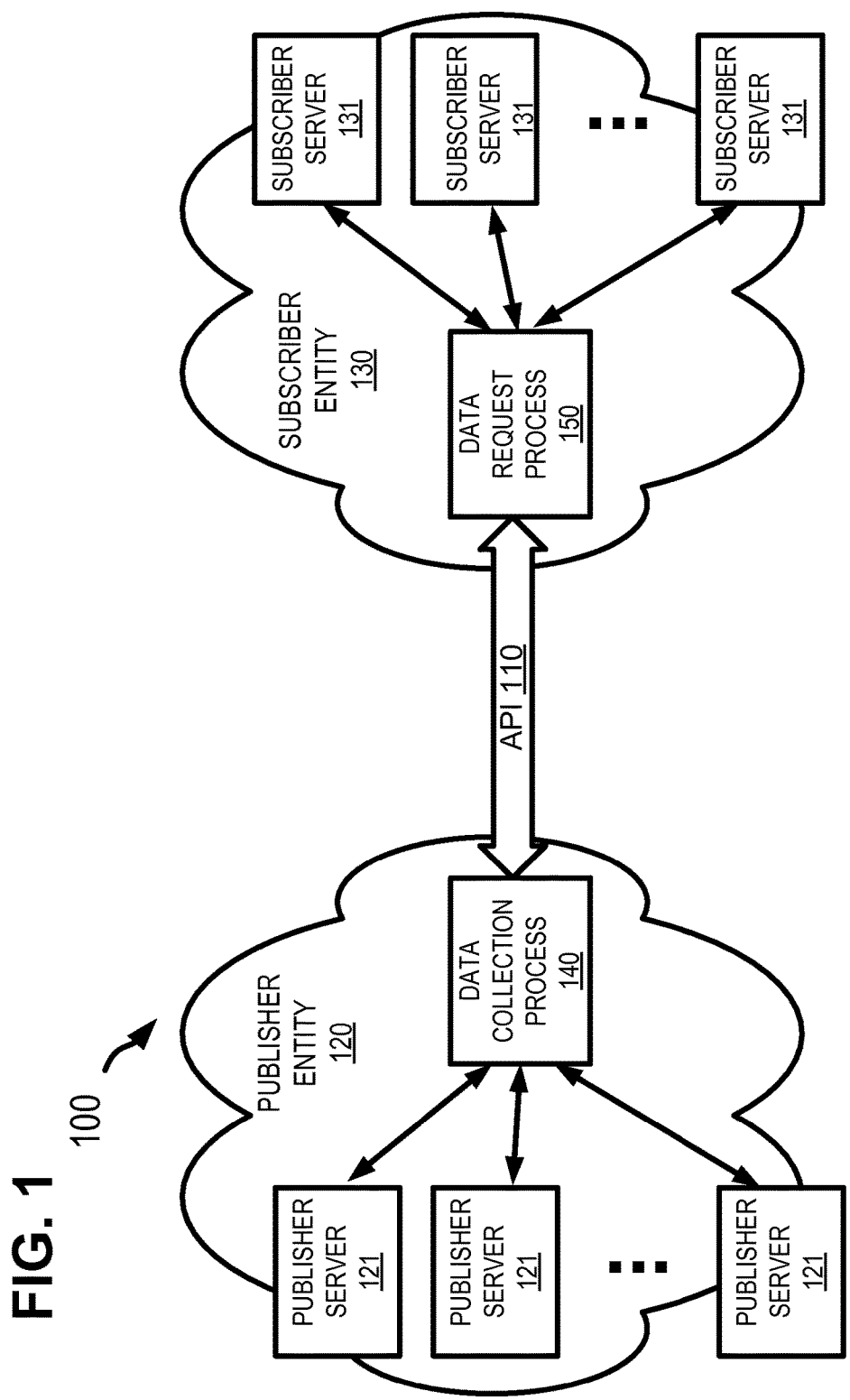
FIGS. 1 and 2 illustrate exemplary environments in which systems and methods described herein may be implemented.

The following detailed description refers to the accompanying drawings. The same reference numbers in different drawings may identify the same or similar elements. Also, the following detailed description does not limit the invention.

Systems and/or methods described herein may provide global standardized application programming (API) based interfaces and an integration platform to enable global entity-to-entity communications, such as to enable a process associated with one entity to access multiple systems at another entity. Potential benefits of a global standardized API-based entity-to-entity data exchange and integration platform include reduced cycle times by accelerating service delivery through automated and streamed data collection processes and an improved overall interface experience by embedding data collection processes into existing tools and improving accuracy by reducing manual data entry errors.

For example, a first data mapping may be defined for using a plurality of APIs to transmit data between a data collection process associated with a publisher entity and a data request process associated with a subscriber entity. A second data mapping may be defined between the data collection process and publisher servers associated with the publisher entity. A third data mapping may be defined between the data request process and subscriber servers associated with the subscriber entity. Data may be exchanged between the publisher entity and the subscriber entity using the plurality of APIs and based on the first data mapping, the second data mapping, and the third data mapping.

For example, the APIs in the present application may be used to generate a service request sent from a first service provider to a second service provider to ask the second service provider to provision a service to a customer of the first service provider. For example, the portions of the service request may be collected using the APIs and may include different types of data. The portions of the service request are forwarded to a validation device associated with the second service provider via the APIs, and the validation device evaluates the portions of the service request to identify any of the portions of the service request that are incomplete or inaccurate. Replacement data for the particular portion that is incomplete or inaccurate is collected using the APIs, and the validation device combines the replacement data with all of the other portions of the service request (excluding the particular portion, if inaccurate) to form a modified service request.

In one implementation, the APIs may include at least one of a sales API to collect information identifying a user generating the service request, an ordering API to collect information regarding the service, an engineering API to collect data regarding equipment and services associated with the first service provider, a provisioning API to collect data related to provisioning the service to the customer by the second service provider, or a billing API to collect payment information associated with the customer.

In one implementation, determining the replacement data may include identifying a data type, of the plurality of types, associated with the particular portion that is incomplete or inaccurate, identifying a particular API, of the plurality of APIs, associated with the identified data type, and collecting the replacement data using the particular API.

In one implementation, collecting the portions of the service request may include providing an interface based on data received from one of the plurality of APIs. A user input may be received through the interface; and some of the portions of the service request may be populated based on the user input.

In one implementation, collecting the portions of the service request may include accessing, using one of the APIs, a backend system that handles one or more services provided by the first service provider; and collecting, from the backend system, one or more of the portions of the service request.

In one implementation, collecting the portions of the service request may include collecting a first portion of the service request using a first API; parsing the first portion to identify at least one of the service or the customer; selecting a second API, from a group of APIs, based on the identified at least one of the service or the customer; and collecting a second portion of the service request using the second API.

In one implementation, transmitting the portions of the service request to the validation device include: establishing a plurality of channels between the validation device and the plurality of APIs; and forwarding the portions of the service request between the plurality of APIs and to the validation device via the plurality of channels.

In another implementation, the APIs may be standardized so that the APIs used to generate and process the service request may also be employed for other functions, such as to modify operation of a network (e.g., based on changes in another network) to maintain a service or to automatically update a network to reflect desired changes to the service.

FIG. 1 is a diagram that depicts an exemplary data collection system 100, in which systems and methods described herein may be implemented. As shown in FIG. 1, data collection system 100 may include an API 110 (referred to collectively as "APIs" 110 and individually as "API") that connects a data collection process 140 (associated with a publisher entity 120) for collecting data from multiple subscriber servers 121 and a data request process 150 (associated with a subscriber entity) for performing a function and/or processing related to the data collected from data collection process 140 via API 110.

As used herein, API 110 may be standardized (in contrast to a simple, generic API) to provide standards-based API implementations for providing a pathway for sending information between publisher entity 120 and subscriber entity 130. For example, API 110 may provide a first interface to specify different types of data to receive from publisher entity 120 (e.g., from multiple publisher servers 121) in connection with data collection process 140 and may generate a series of information packages to provide to subscriber entity 130 in connection with data request process 150. API 110 may further provide a second interface to specify different destinations (e.g., to different subscriber servers 131) to receive various data collected from publisher entity 120. Data collection process 140 may collect data from multiple different sources (e.g., publisher servers 121) that may be associated with multiple different applications that coordinate to perform a complex function or task. As described herein, API 110 may provide a standards-based collection of data so that the same API 110 may be used to exchange data between different parties and/or in different situations (e.g., directed by subscriber entity 130, via data request process 150, to different subscriber servers 131, as desired).

For example, if data collection process 140 relates to a request for service and data request process 150 relates to handling the request, API (or set of APIs) 110 may collect and forward information regarding a customer, such as information identifying the customer and an associated location; may collect and forward information regarding a request service, such as information identifying the service and/or technical attributes associated with the service; and may collect and forward information about publisher entity 120, such as information identifying billing information that can be used by subscriber entity 130 to receive payment for providing the request service.

API 110 may convert/format data packages for use by subscriber entity 130. API 110 may also tag the separate data packages, collected from publisher entity 120, with an identifier associated with data collection process 140 so that data request process 150 may associate the different data packages received from API 110 with the correct corresponding data collection process 150. In another example, API 110 may identify business rules associated with subscriber entity 130, and may collect and forward appropriate information that enables subscriber entity 130 to verify that data from data collection process 140 complies with the business rules.

In one implementation, API 110 may tag data received in connection with data collection process 140. For example, API 110, when collecting data for data collection process 140, may add first tagging information identifying a particular set of transmission from data collection process 140 (e.g., a service request order number) and second tagging information identifying the particular API 110 (e.g., an network address associated with the particular API 110). Subscriber entity 130 may then identify and consolidate portions to form the service request based on the first tagging information. If data request process 150 determines that a portion of the collected data is faulty (e.g., inadequate or incorrect), data request process 150 may use the second tagging information then identify a responsible API 110 and interact with the responsible API to request replacement data. Data request process 150 may then combine the replacement data and previously received portions to form a modified set of data from data collection process 140 based on the first tagging information.

API 110 may be defined as a set of Hypertext Transfer Protocol (HTTP) request messages, along with a definition of the structure of response messages, such as an Extensible Markup Language (XML) or JavaScript Object Notation (JSON) formatted message. For example, API 110 may be integrated into an electronic data interchange (EDI) that provides a framework to generate API 110 to exchange different types of data associated with data collection process 140. For example, API 110 may operate on a device operating between publisher entity 120 and subscriber entity 130.

In operation, API 110 may map data exchanged between data collection process 140 and data request process 150. For example, API 110 may include a first data mapping that logically associates first data collected by data collection process 140 to second data requested by data request process 150. API 110 may further include an interface that allows publisher entity 120 to define second mapping data to associate data stored at publisher servers 121 to the data collected by data collection process 140. In this way, API 110 may enable publisher entity 120 to selectively share data stored and/or generated by different applications implemented by publisher servers 121. API 110 may further include an interface that allows subscriber entity 130 to define third mapping data to associate collected via API 110 (e.g., from data collection process 140) to two or more subscriber servers 131. In this way, API 110 may further enable subscriber entity 130 to selectively allocate data collected from publisher entity 120 for use by different applications implemented by subscriber servers 131.

Figure 2:
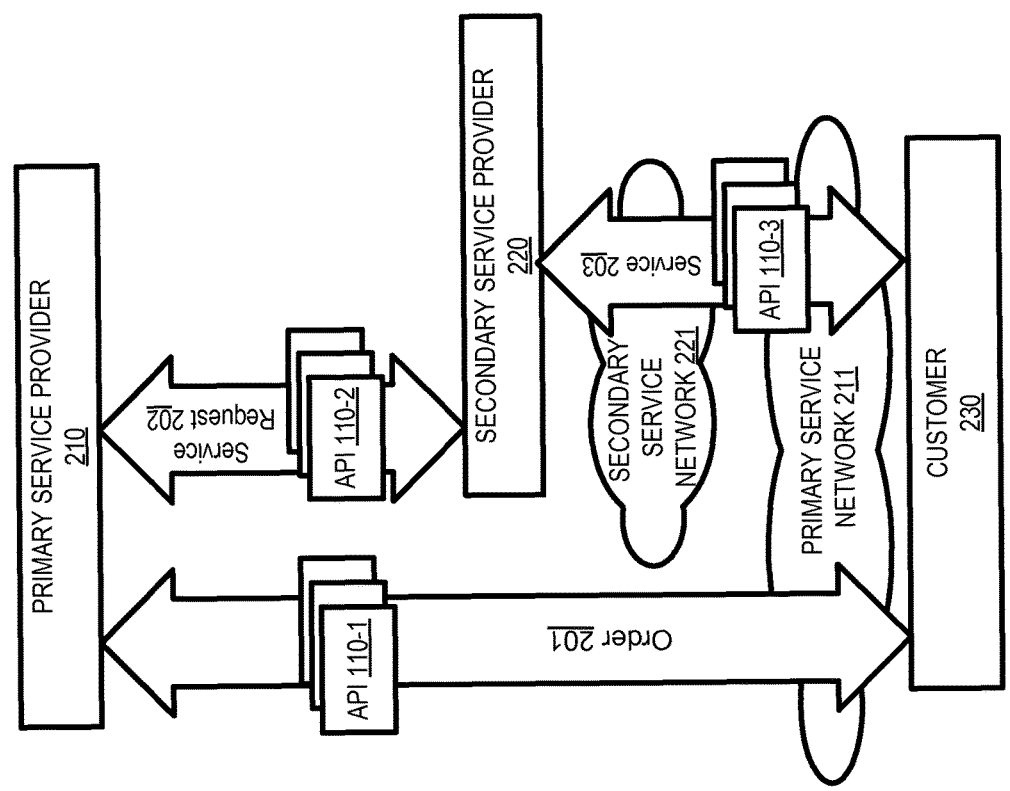

In implementations described herein, APIs 110 may be used to provide a standardized API global platform for business-to-business-to business data exchange. For example, FIG. 2 shows a diagram that depicts an exemplary environment 200 in which data associated with an order 201 is transmitted to a primary service provider 210 from a customer 230. Primary service provider 210 may manage a primary service network 211, and order 201 may relate to a service 203. If primary service provider 210 determines that service 203 is unavailable via primary service network 211 but may, instead, by available from a secondary service provider 220 via a secondary service network 221, primary service provider 210 may forward a service request 202 to secondary service provider 220 to request provisioning of service 203 to customer 230.

As shown in FIG. 2, environment 200 may include, for example, multiple APIs 110 (referred to collectively as "APIs" 110 and individually as "API"). For example, a first set of APIs 110-1 may function to exchange data associated with order 201 between primary service provider 210 and customer 230; a second set of APIs 110-2 may function to exchange data associated with service request 202 between primary service provider 210 and secondary service provider 220; and a third set of APIs 110-3 may function to exchange data associated with services 203 between secondary service provider 220 and customer 230.

In environment 200, data associated with order 201 may be automatically exchanged between applications and systems within customer 230 and primary service provider 210 via APIs 110-1. For example, a first API 110-1 may provide catalog and pricing information identifying goods and services available to customer 230 from primary service provider 210, and second API (or set of APIs) 110-1 may forward data requesting one or more of the goods and services.

In connection with requesting service 203, APIs 110-2 may provide an interface to receive, from primary service provider 210, different types of data related to service request 202 and may generate a series of information packages to provide to secondary service provider 220. For example, a first API (or set of APIs) 110-2 may collect and forward information regarding customer 230, such as information identifying customer 230 and an associated location; a second API (or set of APIs) 110-2 may collect and forward information regarding service 203, such as information identifying the service 203 and/or technical attributes associated with service 203; and a third API (or set of APIs) 110-2 may collect and forward information about primary service provider 210, such as information identifying a particular user generating service request 202 and billing information that can be used by secondary service provider 220 to receive payment for providing service 203.

APIs 110-2 may convert/format data packages, associated with service request 202, for use by secondary service provider 220. APIs 110-2 may also tag the separate data packages, collected from primary service provider 210, with an identifier associated with service request 202 so that secondary service provider 220 may associate the different data packages received from APIs 110-2 with the correct corresponding service request 202. In another example, APIs 110-2 may identify business rules associated with secondary service provider 220, and one or more APIs 110-2 may collect and forward appropriate information that enables secondary service provider 220 to verify that service request 202 complies with the business rules.

In one implementation, APIs 110-2 may tag data received in connection with service request 202. For example, a particular API 110-2, when collecting a portion of service request 202, may add first tagging information identifying an associated service request 202 (e.g., a service request order number) and second tagging information identifying the particular API 110-2 (e.g., an network address associated with the particular API 110-2). Secondary service provider 220 may then identify and consolidate portions to form the service request 202 based on the first tagging information. If a portion of the service request 202 is faulty (e.g., inadequate or incorrect), secondary service provider 220 may use the second tagging information then identify a responsible API 110-2 and interact with the responsible API 110-2 to request replacement data. Secondary service provider 220 may then combine the replacement data and previously received portions to form a modified service request 202 based on the first tagging information.

Primary service provider 210 may provide access to services associated with primary service network 211. For example, primary service network 211 may include a data network, a wireless network, and/or a telephone network. For example, primary service network 211, when operating as a data network, may be any local area network (LAN), metropolitan area network (MAN), wide area network (WAN), the Internet, or any other suitable packet-switched network, such as a commercially owned, proprietary packet-switched network, such as a proprietary cable or fiber-optic network. Primary service network 211, when operating as a wireless network, may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, etc. When operating as a telephone network, primary service network 211 may include a circuit-switched network, such as the public switched telephone network (PSTN), an integrated services digital network (ISDN), a private branch exchange (PBX), or another communications network. In one example, primary service network 211 may include various components in a network to provide internet data access to customer 230.

In other example, primary service network 211 may relate to other industries, such as transportation of people or goods. For example, primary service network 211 may include various segments of a transportation network, such as different modes of transportation (e.g., rail, trucking, airplanes, shipping, etc.) over different regions.

By way of example, primary service provider 210 may provide media content or communication services (e.g., voice, data, video, etc.) to customer 230. Customer 230 may be an individual (or a residence) who receives one or more media services from the primary service provider 210, either directly or indirectly from a content provider. Customer 230 may also be an entity, such as a corporation, enterprise, or organization, that receives one or more media services from the primary service provider 210.

Customer 230 may forward an order 201 to primary service provider 210 to request service 203. Primary service provider 210 may determine that service 203 is unavailable to customer 230 through primary service network 211, and service 203 may be provided by secondary service provider 220 through secondary service network 221. A communication conduit, not depicted in FIG. 1, may be used to provide service 203 to customer 230 from second service provider 220, and may include almost any reasonable form of wired or wireless communication architecture (e.g., landline, cable, fiber optic, satellite-based, cellular, or other communication architecture). For example, if customer 230 desires Ethernet data access at a particular location, service 203 may correspond to a providing a intermediate data pathway for the Ethernet data access between a source and the particular location. In another example, if customer 230 desires transportation of a good to a particular location, service 203 may relate to moving the good along an intermediate segment that is unavailable via primary service network.

In environment 200, data associated with service 203 may be automatically exchanged between applications and systems within customer 230 and secondary service provider 220 via APIs 110-3. For example, a first API 110-3 may provide information regarding levels of service 203 received by customer 230 from secondary service provider 220, and a second API (or set of APIs) 110-3 may forward data requesting a modification of service 203.

Figure 3A:
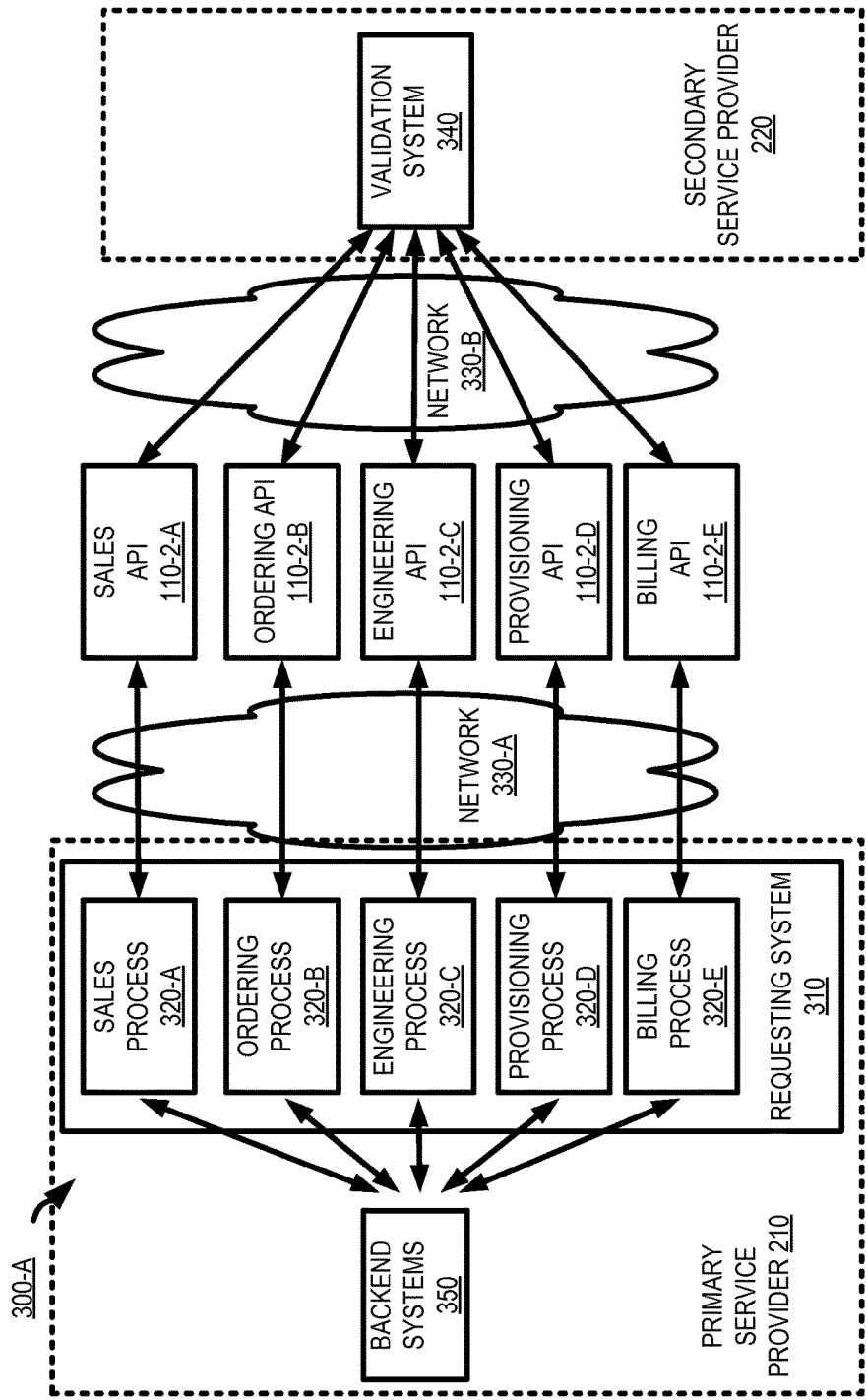

FIGS. 3A-3D show exemplary systems 300-A through 300-D within data collection system 100. As shown in FIG. 3A, system 300-A may include, for example, a requesting system 310 that includes one or more processes 320-A through 320-E associated with APIs 110-2 (shown in FIG. 3A as APIs 110-2-A through 110-2-E), networks 230-A and 230-B, validation system 340, and backend system 350.

Requesting system 310, associated with primary service provider 210, may be a device capable of interfacing with APIs 110-2 to acquire and provide data associated with service request 202 to a validation system 340 associated with secondary service provider 220. Requesting system 310 may connect to network 330-A, for example, through a wireless radio link to exchange data. For example, requesting system 310 may include, for example, a portable computing and/or communications device, such as a personal digital assistant (PDA), a smart phone, a cellular phone, a laptop computer with connectivity to a cellular wireless network, a tablet computer, a wearable computer, etc. Requesting system 310 may also include non-portable computing devices, such as a desktop computer, consumer or business appliance, set-top devices (STDs), or other devices that have the ability to connect to network 330-A.

In system 300-A, requesting system 310 may include processes 320, associated with APIs 110-2, to collect data for service request 202. Processes 320 may collect and forward data for portions of service request 202 to validation system 340 in parallel via APIs 110. APIs 110 may provide processes 320, such as providing a graphical user interface (GUI) or other types of interfaces to collect data from requesting system 310. Processes 320 may generate and forward separate data packages that forward different types of information related to service request 202. In one example, a process 320 may be an application and/or agent that collects data from backend system 350 and forwards the data from requesting system 310 in connection with service request 202. In another example, process 320 may cause requesting system 310 to present a form or other display that that prompts a user to provide a user input associated with service request 202.

For example, requesting system 310 may include a web browser such as Internet Explorer® by Microsoft Corp., Firefox® by Mozilla Corp., Chrome® by Google Inc., Safari by Apple Inc., Opera by Opera Software ASA, etc. The web browser may include a software application, operating on requesting system 310, for retrieving and presenting information resources via network 330-A from APIs 110. The information resource may correspond to a web page, image, video or other piece of content identified by a uniform resource identifier (URI), also referred to as a uniform resource locator (URL), to present processes 320-A through 320-E.

In the example shown in FIG. 3A, requesting device may include a sales process 320-A, an ordering process 320-B, an engineering process 320-C, a provisioning process 320-D, and/or a billing process 320-E that provide associated information to, respectively, sales API 110-2-A, ordering API 110-2-B, engineering API 110-2-C, provisioning API 110-2-D, and billing API 110-2-E. It should be appreciated, however, that system 300-A may include additional, fewer, and/or different types of APIs 110 than shown in FIG. 3A.

Sales process 320-A may collect information regarding a user generating service request 202. For example, sales process 320-A may collect information regarding qualifications of the user, such as the user's title, location, department, or other data that may be used by validation system 340 to confirm that service request 202 is generated by an authorized representative of primary service provider 210.

Ordering process 320-B may collect information regarding service 203, such as information identifying a service type, a location or site associated with customer 230, data identifying equipment operating at the location, or other data that may be used by validation system 340 to confirm that customer 230 is able to receive service 203 from secondary service provider 220 (e.g., proper equipment is present at the location). For example, if service 203 relates to providing access, via an intermediate network associated with secondary service provider 220, to a high capacity data connection provided through primary service network 211, ordering process 320-B may collect data about equipment associated with customer 230 and indicating whether the equipment can connect to the intermediate network or is compatible with the high capacity data connection.

Engineering API 110-2-C may collect data regarding the readiness of primary service provider 210 to interact with secondary service provider 220 to provide service 203. Returning to the example of a service 203 that relates to providing access, via an intermediate secondary service network 221 associated with secondary service provider 220, to a high capacity data connection provided through primary service network 211, engineering API 110-2-C may collect data regarding the availability of the high capacity data connection. Provisioning API 110-2-D may collect data related to provisioning service 203 to customer 230. The provisioning data collected by provisioning API 110-2-D may include, for example, information regarding how secondary service provider 220 may connect to primary service network 211 to provision service 203. Billing API 110-2-E may collect data related to billing of service 203 by secondary service provider 220. For example, billing API 110-2-E may collect account and/or payment information associated with customer 230.

Networks 230-A and 230-B may include one or more networks of various types. For example, networks 230-A and 230-B may include a cable network (e.g., an optical cable network), a wireless satellite network, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., a Public Switched Telephone Network (PSTN)), a local area network (LAN), a wide area network (WAN), a metropolitan area network (MAN), an intranet, and/or the Internet.

In one implementation, APIs 110-2 may identify available bandwidth between networks 230-A and/or 230-B and may acquire data from requesting system 310 and/or the delivery of the data to validation system 340 based on the available bandwidth. In another implementation, an API 110-2 may identify an amount of data that can be transmitted in a package to validation system 340, and may determine types of data to acquire and include in a package based on the available bandwidth. For example, if a relatively large bandwidth is available on networks 230-A and/or 230-B (e.g., data for service request 202 may be transmitted through a channel through networks 230-A and/or 230-B within a particular threshold transmission time), data for service request 202 may be collected by a single API 110. If a relatively smaller bandwidth is available on networks 230-A and/or 230-B (e.g., more than the particular threshold transmission time is needed to transmit data for service request 202 via a channel on networks 230-A and/or 230-B), multiple APIs 110 may collect and forward portions of service request 202 via multiple channels through networks 230-A and/or 230-B. For example, APIs 110 may determine a number of channels needed to transmit service request 202 within a desired transmission time and a corresponding number of APIs 110 may collect and transmit portions of service request 202.

Validation system 340 may be associated with secondary service provider 220 and may collect data from APIs 110-2 to evaluate service request 202. For example, validation system 340 may determine whether service request 202 contains correct information. Validation system 340 may further determine whether service request 202 contains sufficient and correct information to enable secondary service provider 220 to provide service 203 to customer 230. If validation system 340 determines that service request 202 contains sufficient information, validation system 340 may cause a component (not shown) of secondary service provider 220 to provision service 203 to customer 230 based on service request 202. If validation system 340 determines that a portion of service request 202 is inaccurate or incomplete, validation system 340 may identify a particular API 110-2 associated with the portion. For example, the portion of service request 202 may be tagged with data identifying the particular API 110, and validation system 340 may parse the portion of service request 202 and extract the tag data.

Additionally or alternatively, validation system 340 may determine whether secondary service provider 220 can provide service 203. If secondary service provider 220 cannot provide service 203 as specified in service request 202 (e.g., a requested data capacity is not available via secondary service network 221), validation system 340 may interface with requesting system 310 via a particular API 110-2 (e.g., ordering API 110-2-B) to request a modification to service request 202 (e.g., providing a different service 203 or activating service 203 at a different time or location).

If replacement data is needed to approve service request 202, validation system 340 may interface with the particular API 110-2 to collect replacement/additional data from requesting system 310 and/or another component of primary service provider 210. Validation system 340 may store those other portions of service request 202. Validation system 340 may cause a component (not shown) of secondary service provider 220 to provision service 203 to customer 230 based on the stored portions of service request 202 and the replacement/additional data received from the particular API 110.

Backend system 350 may include one or more components to manage services provided by primary service provider 210; manage data related to: the configuration of primary service network 211; capacity management of primary service network 211; service assignment; installation; and/or testing. For example, backend system 350 may handle managing end-to-end connectivity within primary service network 211, and assigning equipment, paths, circuit identifiers, network addresses (e.g., Internet Protocol (IP) addresses) and customer numbers by primary service provider 210.

Although APIs 110-2 are shown in FIG. 3A as collecting data for service request 202 from a requesting system 310, APIs 110 may collect data for service request 202 from multiple systems. For example, system 300-B in FIG. 3B may include APIs 110-2 that collect data for service request 202 from multiple requesting devices 310-A and 310-B. For example, a first requesting system 310-A (e.g., a laptop computer, tablet, smartphone, etc.) may be used by a field agent, working at a location associated with customer 230, to initiate service request 202. In system 300-B, the field agent may initiate service request 202 by interacting with sales API 110-2-A to provide data, through sales process 320-A, identifying the field agent, and interacting with ordering API 110-2-B to provide, via ordering process 320-B, order data associated with service 203.

Based on receiving the sales data and the ordering data via sales API 110-2-A and ordering API 110-2-B, other APIs 110-2-C through 110-2-E (i.e., engineering API 110-2-C, provisioning API 110-2-D, and billing API 110-2-E) may interact with a second requesting system 310-B to provide engineering process 320-C, provisioning process 320-D, and billing process 320-E for obtaining information for provisioning service 203 through equipment and services associated with primary service provider 210 and billing information related to service 203. For example, second requesting system 310-B may be used by a service agent operating remotely from the field agent associated with first requesting system 310.

In another implementation shown in FIG. 3C, system 300-C may include some APIs 110-2 that interact with requesting system 310 to obtain a portion of service request 202, and other APIs 110-2 that obtain portions of service request 202 from other sources. For example, as shown in FIG. 3C, certain APIs 110 may bypass requesting system 310 and interface instead directly with backend system 350 to obtain portions of service request 202. For example, requesting system 310 may be used by the field agent or other worker at primary service provider 210 to initiate service request 202. In system 300-C, service request 202 may be initiated by interacting with (1) sales API 110-2-A to provide data, through sales process 320-A, identifying the requesting official, and (2) ordering API 110-2-B to provide, via ordering process 320-B, order data associated with service 203. Based on receiving the sales data and the ordering data via sales API 110-2-A and ordering API 110-2-B, other APIs 110-2-C through 110-2-E (i.e., engineering API 110-2-C, provisioning API 110-2-D, and billing API 110-2-E) may interact with backend system 350 to obtain information that may be used to validate service request 202 and to provision service 203, such as information for integrating service 203 with equipment and services associated with primary service provider 210 and billing information related to provisioning service 203.

Figure 3D:
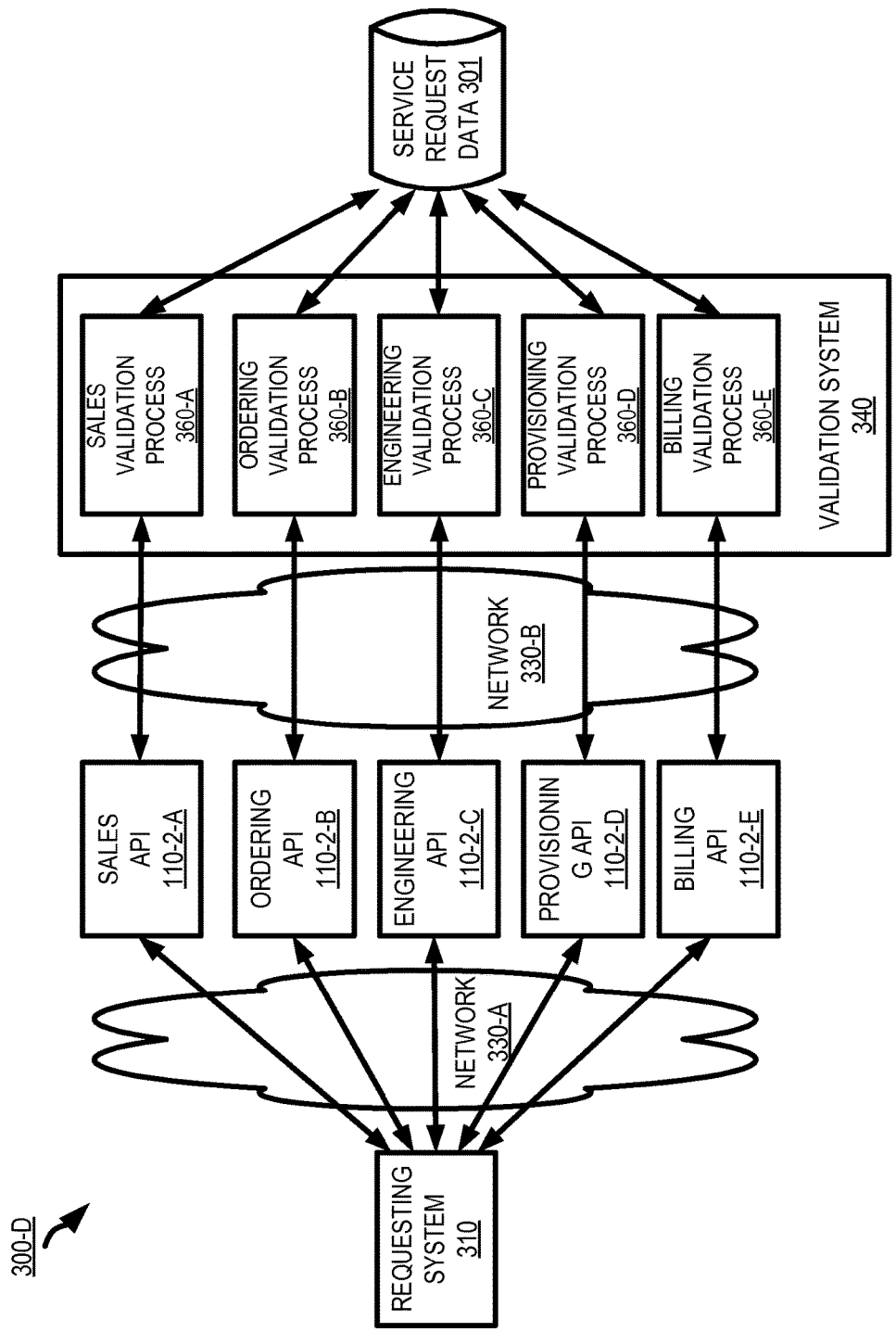

In system 300-D shown in FIG. 3D, validation system 340 may include validation processes 360-A through 360-E that receive data packages for service request 202 and from APIs 110-2-A through 110-2-E. For example, sales validation process 360-A, ordering validation process 360-B, engineering validation process 360-C, provisioning validation process 360-D, and billing validation process 360-E may separately evaluate data received from sales API 110-2-A, ordering API 110-2-B, engineering API 110-2-C, provisioning API 110-2-D, and billing API 110-2-E.

In operation, sales validation process 360-A, ordering validation process 360-B, engineering validation process 360-C, provisioning validation process 360-D, and billing validation process 360-E may forward instructions to, respectively, sales API 110-2-A, ordering API 110-2-B, engineering API 110-2-C, provisioning API 110-2-D, and billing API 110-2-E to identify types of data to include in service request 202 for validation by validation system 340. For example, validation system 340 may require differ types of data for different types of services 102, different business rules, and/or different requesting system 310. For example, validation system 340 may need less data to validate service request 202 if service request 202 is received from a requesting system 310 known to secondary service provider 220 (e.g., requesting system 310 previously forwarded a validated service request 202). In another example, validation system 340 may need less data to validate service request 202 if service request 202 is associated with certain types of services 203.

Validation system 340 may interface with sales API 110-2-A, ordering API 110-2-B, engineering API 110-2-C, provisioning API 110-2-D, and/or billing API 110-2-E to request additional or different data to generate a modified service request 202 if validation system 340 cannot validate data included in an original service request 202. For example, one of sales validation process 360-A, ordering validation process 360-B, engineering validation process 360-C, provisioning validation process 360-D, and/or billing validation process 360-E may determine a portion of original service request 202 that fails validation and may request new data from a corresponding one of sales API 110-2-A, ordering API 110-2-B, engineering API 110-2-C, provisioning API 110-2-D, and/or billing API 110-2-E. Validation system 340 may receive new data from one or more of APIs 110-2-A through API 110-2-E and may combine this new data with data previously received from others of APIs 110-2-A through API 110-2-E to form a revised service request 202.

Although FIGS. 3A-3D show exemplary components of systems 300-A through 300-D, systems 300-A through 300-D may contain fewer components, different components, differently arranged components, or additional components than those depicted in FIGS. 3A-3D. For example, systems 300-A through 300-D may include multiple validation devices 340 that function to validate different portions of service request 202 received from different APIs 110-2. In this way, portions of service request 202 may be examined in parallel as they are received from different APIs 110-2. In another example, one or more APIs 110-2 may interface with directly with customer 230 to obtain a portion of service request from customer 230 (and not from requesting system 310). For example, engineering API 110-2-C may interface with a device associated with customer 230 to identify hardware located at a customer premise, and validation system 340 may verify that the hardware is compatible with service 203.

Figure 4:
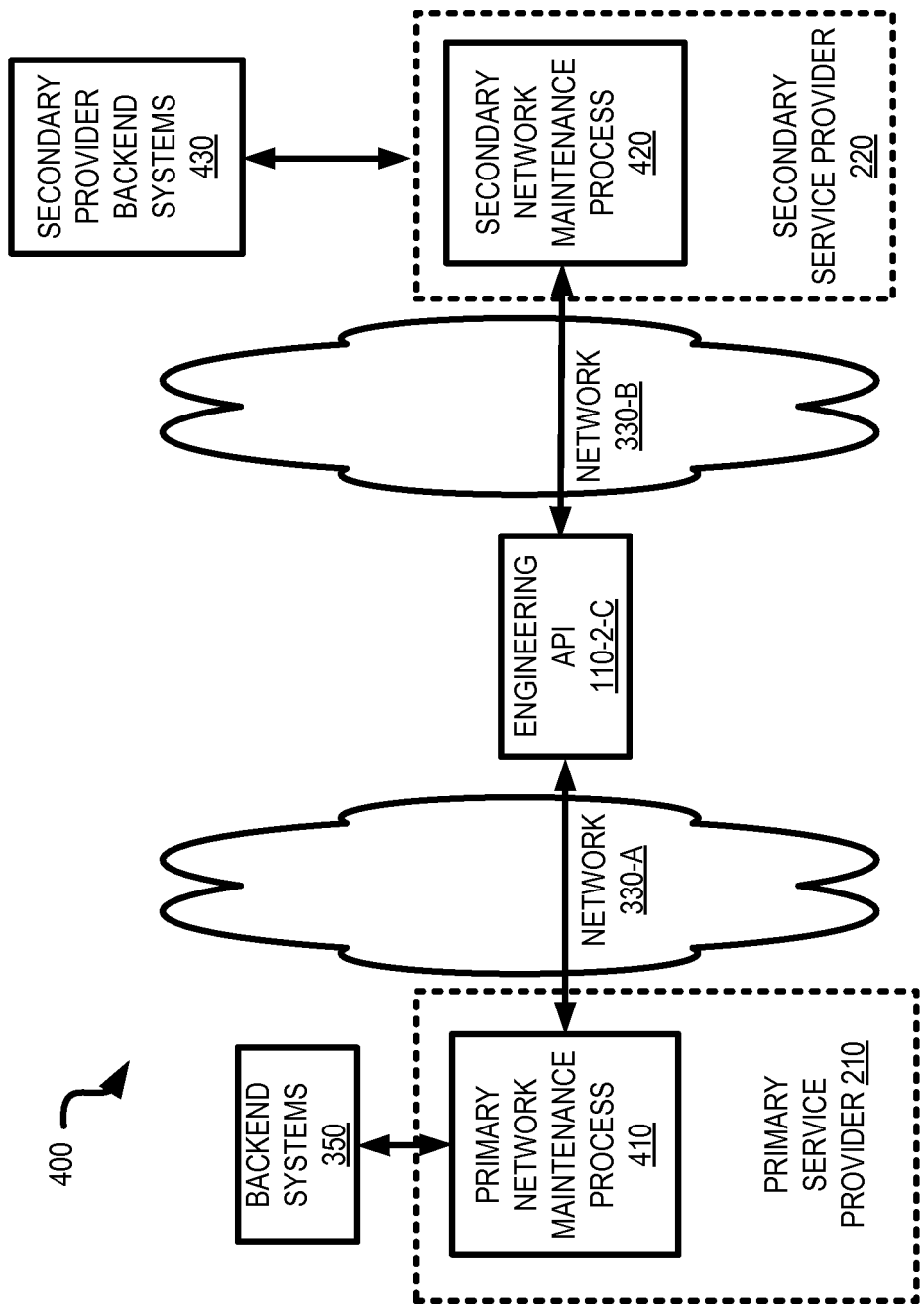
FIGS. 4 and 5 illustrate exemplary systems for exchanging data between different entities within the environment of FIG. 1.

FIG. 4 shows an exemplary system 400 to demonstrate how APIs 110-2 between primary service provider 210 and secondary service provider 220 may be used for other processes that an unrelated to service request 202. In the example shown in FIG. 4, engineering API 110-2-C may be used to coordinate a primary network maintenance process 410 (associated with primary service provider 210) and a secondary network maintenance process 420 (associated with primary service provider 210). As used herein, primary network maintenance process 410 may relate to the collection and distribution of data related to operation of primary service network 211 (e.g., to backend system 350). Similarly, secondary network maintenance process 420 may relate to the collection and distribution (e.g., to secondary provider backend system 430 associated with secondary service provider 220) of data related to operation of secondary service network 221.

In one example, if secondary service provider 220 is going to perform maintenance or otherwise detects a fault in secondary service network 221 (e.g., a line cut) that may influence service 203, second network maintenance process 420 may provide information regarding the fault to primary network maintenance process 410. Primary network maintenance process 410 may provide information regarding the service interruption to backend systems 350. Backend systems 350 use the data collected by primary network maintenance process 410 (as collected by engineering API 110-2-C) to modify the operation of primary service network 211 to address the fault in secondary service network 221. For example, backend systems 350 may modify the operation of primary service network 211 to provide a replacement version of service 203. In this way, primary service network 211 may be automatically adjusted to minimize an impact to customer 230 of the fault in secondary service network 221.

In another example, if primary service provider 210 is going to perform maintenance or otherwise detects a fault in primary service network 211 or detects conditions that indicate a need to modify service 203 (e.g., increasing bandwidth before a period of expected congestion), primary network maintenance process 410 may provide information requesting the modification to service 203 to secondary network maintenance process 420. Secondary network maintenance process 420 may provide information regarding the service interruption to secondary provider backend systems 430. Secondary provider backend systems 430 use the data collected by secondary network maintenance process 420 (as collected by engineering API 110-2-C) to modify the operation of secondary service network 221 to modify service 203. For example, secondary provider backend systems 430 may modify the operation of secondary service network 221 to provide modified service 203. In this way, secondary service network 221 may be automatically adjusted to meet changes in the needs customer 230.

Figure 5:
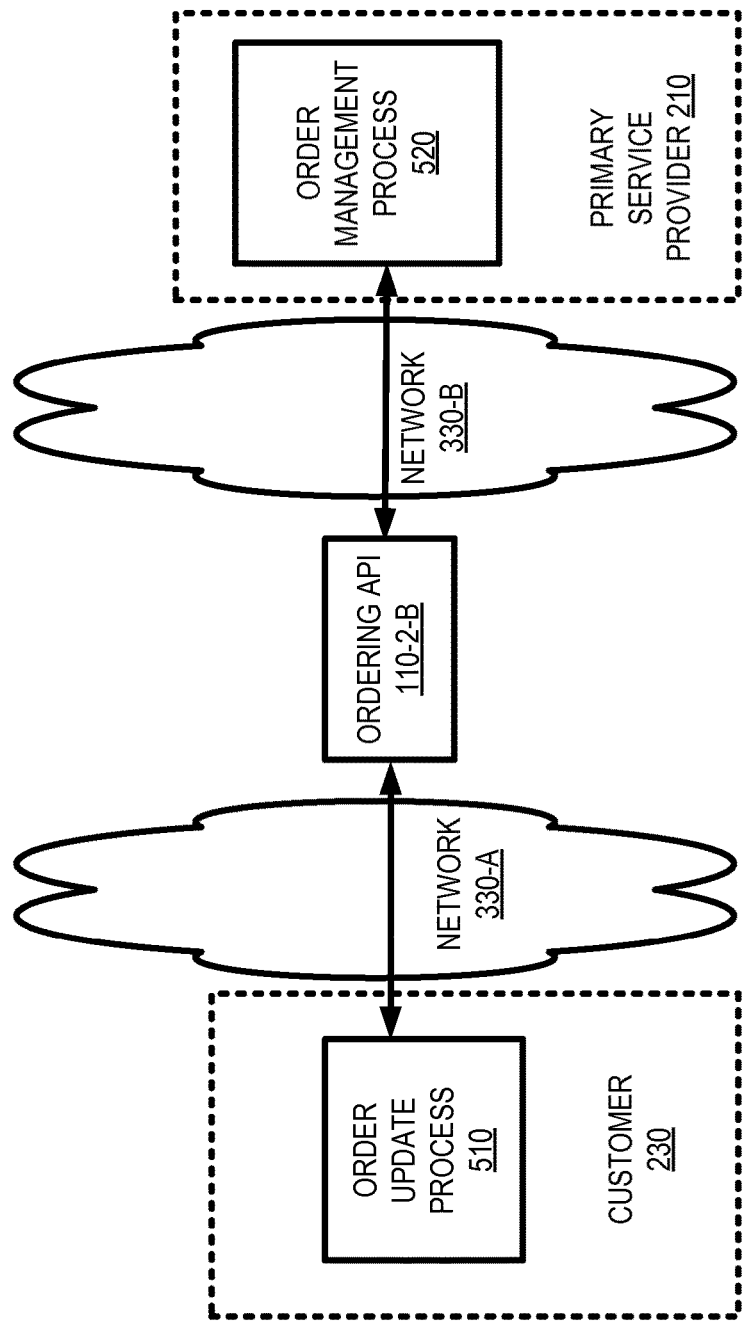

As previously shown in FIG. 2, various APIs 110-1 may exchange data between customer 230 and primary service provider 210, and APIs 110-1 may exchange data between customer 230 and secondary service provider 230. In one example shown in FIG. 5, an exemplary system 500 may include an API 110-1 (order API 110-1-B in FIG. 5) between primary service provider 210 and customer 230. In system 500, order API 110-1-B may be used to coordinate an order updating process 510 associated with customer 230 and an order management process 520 associated with primary service provider 210. For example, if customer 230 desires a change to service 203 (e.g., to request increased Ethernet bandwidth during a particular time period), order updating process 510 may collect and forward information associated with the requested change to service 203. Order management process 520 may evaluate the data collected by order API 110-1-B and determine, for example, whether the service change can be accomplished via primary service network 211 (e.g., using primary network maintenance process 410 in FIG. 4) or whether the requested change to service 203 would require action by secondary service provider 220 (e.g., using secondary service maintenance process 420 in FIG. 4). Thus, service 203 may by dynamically modified without submitting a new order 201 and/or service request 202.

Furthermore, a same API 110 (order API 110 in FIGS. 4 and 5) may be used to exchange data between different parties (e.g., different publisher entity 120 and subscriber entity 130) to providing different data mappings related to different processes.

Figure 6:
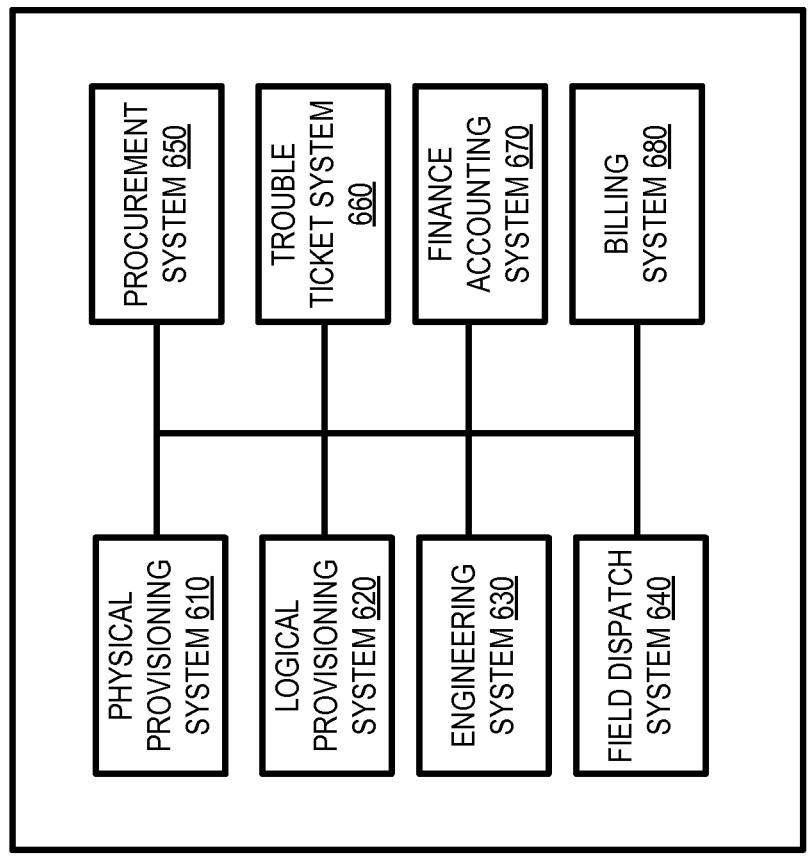
FIG. 6 is a diagram of exemplary components of a backend system included in the systems of FIGS. 3A-3D.

FIG. 6 shows exemplary components that may be included in backend system 350 according to one implementation. As shown in FIG. 6, backend system 350 may include a physical provisioning system 610, a logical provisioning system 620, an engineering system 630, a field dispatch system 640, a procurement system 650, a trouble ticket system 660, a finance/accounting system 670, and a billing system 680.

For example, physical provisioning system 610 may monitor and control the provisioning of various network resources to customer 230, such as by designing physical circuits that need to be placed in the field. Physical provisioning system 610 may store information about the physical circuits, various network elements, customers using the circuits, circuit bandwidth, etc. Logical provisioning system 620 may address open system interconnection (OSI) layer 2 and/or 3 provisioning. For example, logical provisioning system 620 may assign and activate logical ports, assign Internet Protocol (IP) ranges and addresses, etc.

Engineering system 630 can support the functions of an engineering group associated with primary service provider 210. For example, the engineering group may be responsible for conduit runs, buildings, equipment, equipment bays, optical fibers within underground ducts, telephone poles, radio base stations, etc. The engineering group may further handle concerns associated with engineering limitations, environmental factors, and geospatial horizontal and vertical coordinates of equipment. Accordingly, engineering system 630 may track and store data related to the equipments and the related concerns.

Field dispatch system 640 may coordinate the dispatch of technicians to address outages and equipment failure and to perform any necessary installations. For example, field dispatch system 640 may monitor and control allocation of workforce to perform various tasks needed to provide customers with various services, such as set-up and maintenance of customer's services with respect to placed orders. Procurement system 650 can be utilized by primary service provider 210 to coordinate with other service providers and/or equipment manufacturers to acquire assets. Trouble ticket system 660 may function to initiate repair requests associated with providing services (e.g., "trouble tickets") and monitor the status of the repairs.

Finance/accounting system 670 may provide financial planning and analysis support of primary service network 211 and related services. Furthermore, the finance/accounting system 670 may perform asset management, for example, to the extent that monies relating to the procurement of equipment and services are accounted for and suppliers are paid. Billing system 680 provides invoicing capability for the services and/or products provided to customer 230. For instance, billing system 680 may perform account activation and tracking, service feature selection, selection of billing rates for specific calls, invoice creation, payment entry and management of communication with the customers.

In operation, one or more components of backend system 350 may interface with a corresponding API 110. For example (and with reference to FIG. 2C), billing API 110-2-E may interface with finance/accounting system 670 and/or billing system 680 included in backend system 350 to acquire billing information for service 203.

Although FIG. 6 shows exemplary components of backend system 350, backend system 350 may contain fewer components, different components, differently arranged components, or additional components than those depicted in FIG. 3.

Figure 7:
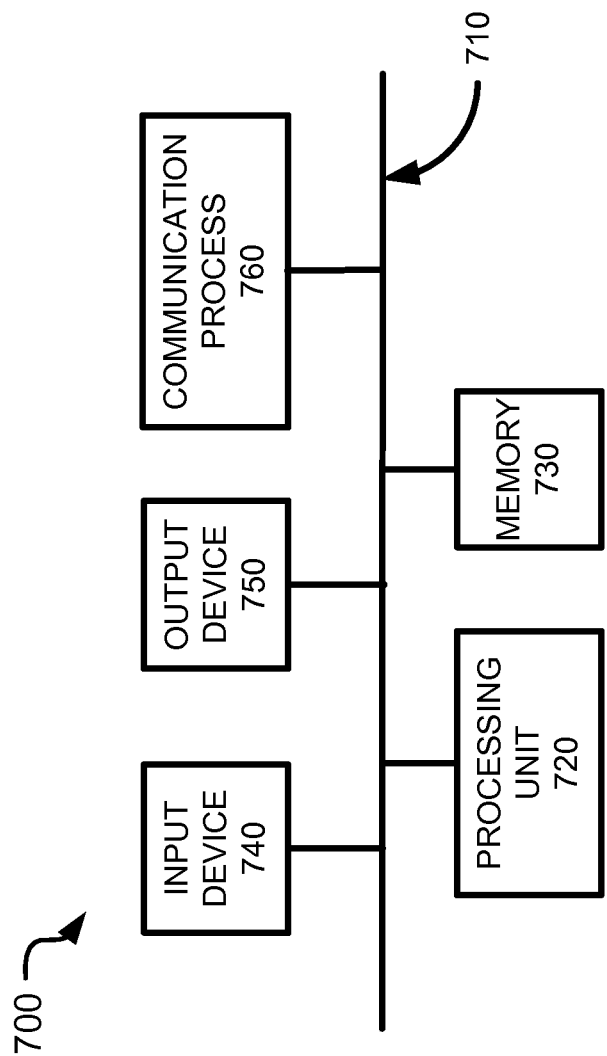
FIG. 7 illustrates an exemplary components of a computing device included in the systems of FIGS. 3A-3D.

FIG. 7 is a diagram of exemplary components of a device 700. A device (not shown) implementing an API 110, requesting system 310, validation system 340, or a component of backend system 350 may include one or more devices 700. As shown in FIG. 7, device 700 may include a bus 710, a processing unit 720, a memory 730, an input device 740, an output device 750, and a communication interface 760.

Bus 710 may permit communication among the components of device 700. Processing unit 720 may include one or more processors or microprocessors that interpret and execute instructions. In other implementations, processing unit 720 may be implemented as or include one or more application specific integrated circuits (ASICs), field programmable gate arrays (FPGAs), or the like.

Memory 730 may include a random access memory (RAM) or another type of dynamic storage device that stores information and instructions for execution by processing unit 720, a read only memory (ROM) or another type of static storage device that stores static information and instructions for the processing unit 720, and/or some other type of magnetic or optical recording medium and its corresponding drive for storing information and/or instructions.

Input device 740 may include a device that permits an operator to input information to device 700, such as a keyboard, a keypad, a mouse, a pen, a microphone, one or more biometric mechanisms, and the like. Output device 750 may include a device that outputs information to the operator, such as a display, a speaker, etc.

Communication interface 760 may include a transceiver that enables device 700 to communicate with other devices and/or systems. For example, communication interface 760 may include mechanisms for communicating with other devices, such as other devices of data collection system 100.

As described herein, device 700 may perform certain operations in response to processing unit 720 executing software instructions contained in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device via communication interface 760. The software instructions contained in memory 730 may cause processing unit 720 to perform processes described herein. Alternatively, hardwired circuitry may be used in place of or in combination with software instructions to implement processes described herein. Thus, implementations described herein are not limited to any specific combination of hardware circuitry and software.

Although FIG. 7 shows example components of device 700, in other implementations, device 700 may include fewer components, different components, differently arranged components, or additional components than those depicted in FIG. 7. Alternatively, or additionally, one or more components of device 700 may perform one or more other tasks described as being performed by one or more other components of device 700.

FIG. 8 shows a flow chart of an exemplary process 800 for exchanging of data between a publisher entity 120 and a subscriber entity 130 using API 110. Process 800 may be performed by one or more components of data collection system 100, such as API 110, data collection process 140, and/or data request process 150.

As shown in FIG. 8, process 800 may include defining a first data mapping between publisher entity 120 and subscriber entity 130 (block 810). For example, API 110 may include a first data mapping that logically associates first data collected by data collection process 140 to second data requested by data request process 150. In one implementation, defining the first mapping in block 810 may include converting the data from a first format to a second format that is compatible with the data request process 150.

As shown in FIG. 8, process 800 may include defining a second data mapping between data collection process 140 and publisher servers 121 (block 820). For example, API 110 may further include an interface that allows publisher entity 120 to define the second mapping data to associate data stored at publisher servers 121 to the data collected by data collection process 140. In this way, API 110 may enable publisher entity 120 to selectively share data stored and/or generated by different applications implemented by publisher servers 121.

As shown in FIG. 8, process 800 may further include defining a third data mapping between data request process 150 and subscriber servers 131 (block 830). For example, API 110 may provide an interface that allows subscriber entity 130 to define the third mapping data to associate collected via API 110 (e.g., from data collection process 140) to two or more subscriber servers 131. In this way, API 110 may enable subscriber entity 130 to selectively allocate data collected from publisher entity 120 for use by different applications implemented by subscriber servers 131.

As shown in FIG. 8, process 800 may further include exchanging data between publisher entity 120 and subscriber entity 130 based on mappings (block 840). For example, data may be collected by data collection process 140 from publisher servers 121 based on the second data mapping, this data may be transmitted to data request process 150 based on the first data mapping, and the data received by data request process 150 may be forwarded to subscriber servers 131 based on third data mapping.

FIG. 9 shows a flow chart of an exemplary process 900 for generating and handling service request 202 in accordance with one implementation. Process 900 may be performed by one or more components of systems 300-A through 300-D, such as APIs 110, requesting system 310, validation system 340, and/or backend system 350 or by another component not shown in FIGS. 3A-3D.

As shown in FIG. 9, process 900 may include collecting portions of service request 202 using APIs 110 (block 910) and forwarding the portions of the service request to validation system 340 associated with secondary service provider 220 (block 920). For example, as described above with respect to FIG. 3A, sales API 110-2-A may collect information regarding a user generating and/or inputting information related to service request 202; ordering API 110-2-B may collect information regarding service 203; engineering API 110-2-C may collect data regarding services and equipment of primary service provider 210; provisioning API 110-2-D may collect data related to provisioning service 203 to customer 230; and billing API 110-2-E may collect data related to paying secondary service provider 220 for providing service 203.

In one implementation, process block 910 may include receiving, from a first API (or group of APIs) 110, a first portion of service request 202 that identifies, for example, service 203, primary service provider 210, and/or customer 230. Then, a second API (or group of APIs) 110 may be selected from a larger set of APIs based on the data included in the first portion of service request 202. For example, certain APIs 110 may be selectively activated to collect information for validation system 340 based on service 203, primary service provider 210, and/or customer 230. For example, validation system 340 may not need billing information to approve service request 202 if secondary service provider 220 already has an existing commercial relationship with customer 230.

In process block 920, the separate portions of service request 202 may be sent to validation system 340 via separate channels. For example, APIs 110 may establish different channels to transmit different portions of service request 202 between requesting system 310 and validation system 340.

As shown in FIG. 9, process 900 may further include determining whether service request 202 is approved (e.g., validated) by validation system 340. For example, validation system 340 may determine whether the portions of service request 202 include sufficient information to provision service 203 to customer 230. If service request 202 is approved by validation system 340 (block 930-Yes), process 900 ends.

As shown in FIG. 9, if service request 202 is not approved by validation system 340 (block 930-No), process 900 may also include determining a portion of service request that is not approved (e.g., rejected by) validation system 340 (block 940); and determining an API 110 associated with the rejected portion (block 950). For example, validation system 340 may identify a particular portion of service request 202 that is incomplete and/or inaccurate and may identify a corresponding API 110 based on the contents of the particular portion. For example, the particular portion may include information (e.g., a tag) identifying a corresponding API 110 that collected and transmitted the portion. Additionally or alternatively, the portion of service request 202 may be parsed to identify a type of data included in the portion, and an API 110 may be identified based on the data type.

Continuing with FIG. 9, process 900 may further include collecting a replacement portion of service request 202 via the determined API 110 (block 960); and forwarding the replacement portion of service request 202 to validation system 340 (block 970). For example, validation system 340 may forward, to the determined API 110, information identifying a type of data to be collected and/or corrected, and the API 110 may forward the replacement data to validation system 340. Validation system 340 may combine the data in the replacement portion of service request 202 with other, previously received portions of service request 202 to form a modified service request 202 (block 980), and process 900 may return to block 930 to determine whether the modified service request can be approved by validation system 340.

FIG. 10 shows an exemplary application layer 1000 that may include one or more different types of APIs 110 to provide different services 203 in a subscription-based network, such as data, communications, and/or content distribution services. In the example shown in FIG. 10, application layer 1000 may include a consumption API 1010, a services API 1020, a distribution API 1030, an ingestion API 1040, middleware 1050, and administrative functions 1060. In other implementations, application layer 1000 include additional, fewer, and/or different components than those shown in FIG. 10.

Application layer 1000 may enable a primary service provider 210 associated with, for example, a website and/or an application operator to enable customer 230 to access service 203 provided by a secondary service provider 220. In the following discussion, service 203 may be related to data, communications, and/or content distribution services. Furthermore, consumption API 1010, services API 1020, distribution API 1030, and/or ingestion API 1040 may be implemented using a standardized API 110 (e.g., ordering API 110-2-B and/or engineering API 110-2-C).

For example, consumption API 1010 may enable an application or website managed by primary service provider 210 to provide access to voice, data, and/or communications services to customer 230. For example, consumption API 1020 may enable customer 230 to access to digital content (e.g., video or other multimedia content provided by secondary service provider 220) by a customer 230. For example, consumption API 1010 may include a first interface that enables primary service provider 210 to provide inputs related to providing the digital contents to customer 230 (e.g., data for accessing a first server to obtain an intermediate IP address to enable a session to be established between the content provider and customer 230). Consumption API 1010 may further include a second interface that enables secondary service provider 220 to define various data (e.g., a storage address of the digital content) that may be used by middleware 1050 to deliver the contents and/or by administrative functions 1060 (e.g., billing for the delivery of the digital contents.).

For example, consumption API 1010 may enable a website or application operator to provide a certain data, communications, and/or entertainment services to customer 230 via an intermediate access provider, and to pay for these services. For example, certain content (e.g., a commercial) may be forwarded to customer 230 without cost (e.g., as "free" wireless minutes) while customer 230 is responsible for costs related to accessing other data.

In another example, services API 1020 may enable an application or website managed by primary service provider 210 to enable customer 230 to access services related to the voice, data, and/or communications services. For example, services API 1020 may enable customer 230 to access data (e.g., a program guide) related to multimedia content presented via consumption API 1010. Services API 1020 may include a first interface that enables primary service provider 210 to provide inputs related to providing the service (e.g., data, such as an IP addresses, for accessing a first application server to obtain data and a second application to obtain instructions for the service based on the data obtained from the first server). For example, the first application server may access information regarding customer 230 (e.g., the customer's location, subscriptions, etc.), and the second application server may access data associated with multimedia programming available at the customer's location.

Distribution API 1030 may enable primary service provider 210 to provide distribution services (provided by secondary service provider 220) to customer 230. For example, distribution API 1030 may be used primary service provider 210 to interface with a multiprotocol label switching (MPLS) mechanism a telecommunications network to direct data from one network node to a next node operated by secondary service provider 220. Similarly, distribution API 1030 may be used primary service provider 210 to interface with secondary service provider 220 to provide one or more paths in a content delivery network (CDN) providing digital content to customer 230.

Ingestion API 1040 may enable primary service provider 210 to provide access services (provided by secondary service provider 220) to customer 230. For example, primary service provider 210 may enable customer 230 to access data via a local access point provided by provided by secondary service provider 220. For example, if primary service provider 210 is associated with a wireless wide area network (WWAN) such as a long-term evolution network, ingestion API 1040 may be used by primary service provider 210 to enable customer 230 to be handed over to a local hot spot. For example, ingestion API 1040 may collect session information regarding customer 230, and secondary service provider 220 may use this session information to hand over customer 230 to a local hot spot managed by secondary service provider 220 without receiving a request or other information from a device associated with customer 230.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to processes 800 and 900 in FIGS. 8 and 9, the order of the blocks may be modified in other implementations. Further, non-dependent blocks in processes 800 and 900 may be performed in parallel.

It will be apparent that different aspects of the description provided above may be implemented in many different forms of machine-readable instructions, firmware, and hardware in the implementations illustrated in the figures. The actual machine-readable instructions or specialized control hardware used to implement these aspects is not limiting of the invention. Thus, the operation and behavior of these aspects were described without reference to the specific machine-readable instructions—it being understood that machine-readable instructions and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and machine-readable instructions.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    defining, by a processor, a first data mapping for using a plurality of standards-based application programming interfaces (APIs) to transmit data between a data collection process associated with a publisher entity and a data request process associated with a subscriber entity;
    defining, by the processor, a second data mapping between the data collection process and publisher servers associated with the publisher entity;
    defining, by the processor, a third data mapping between the data request process and subscriber servers associated with the subscriber entity; and
    exchanging, by the processor and using the plurality of APIs, data between the publisher entity and the subscriber entity based on the first data mapping, the second data mapping, and the third data mapping,

19 wherein the publisher entity is associated with a first service provider and the subscriber entity is associated with a second service provider, and wherein the exchanging data includes:

collecting portions of a service request, wherein the service request is sent from the first service provider to the second service provider to ask the second service provider to provision a service to a customer of the first service provider, wherein the portions of the service request are collected using the plurality of APIs, and wherein the portions of the service request include a plurality of types of data;

transmitting, via the plurality of APIs, the portions of the service request to a validation device associated with the second service provider, wherein the validation device evaluates the portions of the service request to identify a particular portion, of the portions of the service request, that is incomplete or inaccurate;

determining replacement data for the particular portion using one or more of the plurality of APIs; and forwarding the replacement data to the validation device, wherein the validation device combines the replacement data and one or more of the portions of the service request to form a modified service request.

2. The method of claim 1, wherein the plurality of APIs include at least one of:

a sales API to collect information identifying a user generating the service request, an ordering API to collect information regarding the service, an engineering API to collect data regarding equipment and services associated with the first service provider, a provisioning API to collect data related to provisioning the service to the customer by the second service provider, or a billing API to collect include payment information associated with the customer.

3. The method of claim 1, wherein determining the replacement data includes:

identifying a data type, of the plurality of types, associated with the particular portion that is incomplete or inaccurate;

identifying a particular API, of the plurality of APIs, associated with the identified data type; and collecting the replacement data using the particular API.

4. The method of claim 1, wherein collecting the portions of the service request includes:

accessing, using one of the plurality of APIs, a backend system associated with the first service provider to obtain portions of the service request, wherein the backend system handles services provided by the first service provider; and collecting, from the backend system, one or more of the portions of the service request.

5. The method of claim 1, wherein collecting the portions of the service request includes:

collecting a first portion of the service request using a first API;

parsing the first portion to identify at least one of the service or the customer;

selecting a second API, from a group of APIs, based on the identified at least one of the service or the customer; and

20 collecting a second portion of the service request using the second API.

6. The method of claim 1, wherein transmitting the portions of the service request to the validation device include:

tagging the portions of the service request with tagging data identifying the service request;

establishing a plurality of channels between the validation device and the plurality of APIs; and separately forwarding the portions of the service request between the plurality of APIs and to the validation device via the plurality of channels, wherein the validation device combines the portions of the service request based on the tagging data.

7. A device comprising:

a memory to store instructions; and a processor configured to execute one or more of the instructions to:

define a first data mapping for using a plurality of application programming interfaces (APIs) to transmit data between a data collection process associated with a publisher entity and a data request process associated with a subscriber entity;

define a second data mapping between the data collection process and publisher servers associated with the publisher entity;

define a third data mapping between the data request process and subscriber servers associated with the subscriber entity; and exchange, using the plurality of APIs, data between the publisher entity and the subscriber entity based on the first data mapping, the second data mapping, and the third data mapping, wherein the publisher entity is associated with a first service provider and the subscriber entity is associated with a second service provider, and wherein the processor, when executing the one or more of the instructions to exchange the data, is further configured to:

collect portions of a service request, wherein the service request is sent from the first service provider to the second service provider to ask the second service provider to provision a service to a customer of the first service provider, wherein the portions of the service request are collected using the plurality of APIs, and wherein the portions of the service request include a plurality of types of data;

transmit, via the plurality of APIs, the portions of the service request to a validation device associated with the second service provider, wherein the validation device evaluates the portions of the service request to identify a particular portion, of the portions of the service request, that is incomplete or inaccurate;

determine replacement data for the particular portion using one or more of the plurality of APIs; and forward the replacement data to the validation device, wherein the validation device combines the replacement data and one or more of the portions of the service request to form a modified service request.

8. The device of claim 7, wherein the plurality of APIs include at least one of:

a sales API to collect information identifying a user generating the service request, an ordering API to collect information regarding the service, an engineering API to collect data regarding equipment and services associated with the first service provider, a provisioning API to collect data related to provisioning the service to the customer by the second service provider, or a billing API to collect include payment information associated with the customer.

9. The device of claim 7, wherein the processor, when determining the replacement data, is further configured to execute one or more of the instructions to:

identify a data type, of the plurality of types, associated with the particular portion that is incomplete or inaccurate;

identify a particular API, of the plurality of APIs, associated with the identified data type; and collect the replacement data using the particular API.

10. The device of claim 7, wherein the processor, when collecting the portions of the service request, is further configured to execute one or more of the instructions to:

provide an interface based on data received from one of the plurality of APIs;

receive, through the interface, a user input; and populate one or more of the portions of the service request based on the user input.

11. The device of claim 7, wherein the processor, when collecting the portions of the service request, is further configured to execute one or more of the instructions to:

collect a first portion of the service request using a first API;

parse the first portion to identify at least one of the service or the customer;

select a second API, from a group of APIs, based on the identified at least one of the service or the customer; and collect a second portion of the service request using the second API.

12. The device of claim 7, wherein the processor, when transmitting the portions of the service request to the validation device, is further configured to execute one or more of the instructions to:

establish a plurality of channels between the validation device and the plurality of APIs; and forward the portions of the service request between the plurality of APIs and to the validation device via the plurality of channels.

13. A non-transitory computer-readable medium storing instructions, the instructions comprising:

one or more instructions that, when executed by a processor, cause the processor to:

define a first data mapping for using a plurality of application programming interfaces (APIs) to transmit data between a data collection process associated with a publisher entity and a data request process associated with a subscriber entity;

define a second data mapping between the data collection process and publisher servers associated with the publisher entity;

define a third data mapping between the data request process and subscriber servers associated with the subscriber entity; and exchange, using the plurality of APIs, data between the publisher entity and the subscriber entity based on the first data mapping, the second data mapping, and the third data mapping, wherein the publisher entity is associated with a first service provider and the subscriber entity is associated with a second service provider, and wherein the one or more instructions, when executed by the processor to exchange the data, further cause the processor to:

collect portions of a service request, wherein the service request is sent from the first service provider to the second service provider to ask the second service provider to provision a service to a customer of the first service provider, wherein the portions of the service request are collected using the plurality APIs, and wherein the portions of the service request include a plurality of types of data;

transmit, via the plurality of APIs, the portions of the service request to a validation device associated with the second service provider, wherein the validation device evaluates the portions of the service request to identify a particular portion, of the portions of the service request, that is incomplete or inaccurate;

determine replacement data for the particular portion using one or more of the plurality of APIs; and forward the replacement data to the validation device, wherein the validation device combines the replacement data and one or more of the portions of the service request to form a modified service request.

14. The non-transitory computer-readable medium of claim 13, wherein the plurality of APIs include at least one of:

a sales API to collect information identifying a user generating the service request, an ordering API to collect information regarding the service, an engineering API to collect data regarding equipment and services associated with the first service provider, a provisioning API to collect data related to provisioning the service to the customer by the second service provider, or a billing API to collect include payment information associated with the customer.

15. The non-transitory computer-readable medium of claim 13, wherein the one or more instructions, when causing the processor to determine the replacement data, further cause the processor to:

identify a data type, of the plurality of types, associated with the particular portion that is incomplete or inaccurate;

identify a particular API, of the plurality of APIs, associated with the identified data type; and collect the replacement data using the particular API.

16. The non-transitory computer-readable medium of claim 13, wherein the one or more instructions, when causing the processor to collect the portions of the service request, further cause the processor to:

access, using one of the plurality of APIs, a backend system associated with the first service provider to obtain portions of the service request, wherein the backend system handles services provided by the first service provider; and collect, from the backend system, one or more of the portions of the service request.

17. The non-transitory computer-readable medium of claim 13, wherein the one or more instructions, when causing the processor to collect the portions of the service request, further cause the processor to:

collect a first portion of the service request using a first API;

parse the first portion to identify at least one of the service or the customer;

select a second API, from a group of APIs, based on the identified at least one of the service or the customer; and collect a second portion of the service request using the second API.

* * * * *